(12) United States Patent
Huh

(10) Patent No.: US 8,947,680 B2
(45) Date of Patent: Feb. 3, 2015

(54) METHOD AND APPARATUS FOR PERFORMING DIRECT PRINTING BY ANALYZING THE BYTES OF THE PRINT DATA

(71) Applicant: Samsung Electronics Co., Ltd, Suwon-si, Gyeonggi-do (KR)

(72) Inventor: Young-hee Huh, Ulsan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 9 days.

(21) Appl. No.: 13/621,945

(22) Filed: Sep. 18, 2012

(65) Prior Publication Data

US 2013/0107299 A1 May 2, 2013

(30) Foreign Application Priority Data

Oct. 26, 2011 (KR) .................. 10-2011-0110072

(51) Int. Cl.
*G06F 3/12* (2006.01)
*G06K 15/02* (2006.01)

(52) U.S. Cl.
CPC ............ *G06K 15/1802* (2013.01); *G06K 15/02* (2013.01); *G06K 15/1822* (2013.01); *G06K 15/1827* (2013.01)
USPC ........................................................ 358/1.1

(58) Field of Classification Search
CPC ............. H04L 51/066; G06F 17/2217; G06F 9/30145; G06F 17/30569; G06F 9/30; G06K 15/1835
USPC ................................. 712/200; 358/1.1, 1.15
See application file for complete search history.

(56) References Cited

U.S. PATENT DOCUMENTS

| 5,732,197 | A | 3/1998 | Nakagiri | |
|---|---|---|---|---|
| 6,370,531 | B1 * | 4/2002 | Boutcher et al. | 1/1 |
| 7,428,985 | B1 * | 9/2008 | Moreland et al. | 235/379 |
| 2004/0223175 | A1 * | 11/2004 | Lee | 358/1.13 |

FOREIGN PATENT DOCUMENTS

JP 2006007572 * 1/2006

OTHER PUBLICATIONS

European Office Action dated Jan. 23, 2013 issued in EP Application No. 12185950.8.

* cited by examiner

*Primary Examiner* — Eric A Rust
(74) *Attorney, Agent, or Firm* — Staas & Halsey LLP

(57) ABSTRACT

An image forming apparatus to perform direct printing of print data, wherein the image forming apparatus receives print data encoded in a first encoding method, determines whether the received print data includes a character expressed in 2 bytes, converts the print data encoded in the first encoding method to be encoded in a second encoding method of analyzing the character expressed in 2 bytes in the image forming apparatus if the print data includes the character expressed in 2 bytes, and forms an image of the converted print data.

20 Claims, 9 Drawing Sheets

| Ctrl | Dec | Hex | Char | Code | Dec | Hex | Char | Dec | Hex | Char | Dec | Hex | Char |
|---|---|---|---|---|---|---|---|---|---|---|---|---|---|
| ^@ | 0 | 00 | | NUL | 32 | 20 | | 64 | 40 | @ | 96 | 60 | ` |
| ^A | 1 | 01 | | SOH | 33 | 21 | ! | 65 | 41 | A | 97 | 61 | a |
| ^B | 2 | 02 | | STX | 34 | 22 | " | 66 | 42 | B | 98 | 62 | b |
| ^C | 3 | 03 | | ETX | 35 | 23 | # | 67 | 43 | C | 99 | 63 | c |
| ^D | 4 | 04 | | EOT | 36 | 24 | $ | 68 | 44 | D | 100 | 64 | d |
| ^E | 5 | 05 | | ENQ | 37 | 25 | % | 69 | 45 | E | 101 | 65 | e |
| ^F | 6 | 06 | | ACK | 38 | 26 | & | 70 | 46 | F | 102 | 66 | f |
| ^G | 7 | 07 | | BEL | 39 | 27 | ' | 71 | 47 | G | 103 | 67 | g |
| ^H | 8 | 08 | | BS | 40 | 28 | ( | 72 | 48 | H | 104 | 68 | h |
| ^I | 9 | 09 | | HT | 41 | 29 | ) | 73 | 49 | I | 105 | 69 | i |
| ^J | 10 | 0A | | LF | 42 | 2A | * | 74 | 4A | J | 106 | 6A | j |
| ^K | 11 | 0B | | VT | 43 | 2B | + | 75 | 4B | K | 107 | 6B | k |
| ^L | 12 | 0C | | FF | 44 | 2C | , | 76 | 4C | L | 108 | 6C | l |
| ^M | 13 | 0D | | CR | 45 | 2D | - | 77 | 4D | M | 109 | 6D | m |
| ^N | 14 | 0E | | SO | 46 | 2E | . | 78 | 4E | N | 110 | 6E | n |
| ^O | 15 | 0F | | SI | 47 | 2F | / | 79 | 4F | O | 111 | 6F | o |
| ^P | 16 | 10 | | DLE | 48 | 30 | 0 | 80 | 50 | P | 112 | 70 | p |
| ^Q | 17 | 11 | | DC1 | 49 | 31 | 1 | 81 | 51 | Q | 113 | 71 | q |
| ^R | 18 | 12 | | DC2 | 50 | 32 | 2 | 82 | 52 | R | 114 | 72 | r |
| ^S | 19 | 13 | | DC3 | 51 | 33 | 3 | 83 | 53 | S | 115 | 73 | s |
| ^T | 20 | 14 | | DC4 | 52 | 34 | 4 | 84 | 54 | T | 116 | 74 | t |
| ^U | 21 | 15 | | NAK | 53 | 35 | 5 | 85 | 55 | U | 117 | 75 | u |
| ^V | 22 | 16 | | SYN | 54 | 36 | 6 | 86 | 56 | V | 118 | 76 | v |
| ^W | 23 | 17 | | ETB | 55 | 37 | 7 | 87 | 57 | W | 119 | 77 | w |
| ^X | 24 | 18 | | CAN | 56 | 38 | 8 | 88 | 58 | X | 120 | 78 | x |
| ^Y | 25 | 19 | | EM | 57 | 39 | 9 | 89 | 59 | Y | 121 | 79 | y |
| ^Z | 26 | 1A | | SUB | 58 | 3A | : | 90 | 5A | Z | 122 | 7A | z |
| ^[ | 27 | 1B | | ESC | 59 | 3B | ; | 91 | 5B | [ | 123 | 7B | { |
| ^\ | 28 | 1C | | FS | 60 | 3C | < | 92 | 5C | \ | 124 | 7C | | |
| ^] | 29 | 1D | | GS | 61 | 3D | = | 93 | 5D | ] | 125 | 7D | } |
| ^^ | 30 | 1E | ▲ | RS | 62 | 3E | > | 94 | 5E | ^ | 126 | 7E | ~ |
| ^_ | 31 | 1F | ▼ | US | 63 | 3F | ? | 95 | 5F | _ | 127 | 7F | ⌂* |

```
1B 2A 63 33 44 1B 29 73 32 32 33 34 36 35 57 00 ; .*c3D)]s223465W.
48 0F 02 00 00 00 C0 17 F0 0E A6 00 01 00 00 04 ; H.......??....
00 00 00 04 12 00 C0 00 6F 42 40 02 00 00 00 00 ; .........oB@....
00 00 00 00 00 C0 2F 00 00 05 83 CD 00 00 00 41 ; .....?...?...A
6E 64 61 6C 65 20 4D 6F 6E 6F 20 57 54 20 53 08 ; ndale Mono WT S.
00 FF 97 00 CD 01 00 43 43 00 08 03 2A 62 2C 00 ; . ??.CC...*b,.
00 00 06 43 50 00 59 44 69 67 69 74 69 7A 65 64 ; ...CP.YDigitized
20 64 61 74 61 20 63 6F 70 79 72 69 67 68 74 20 ; data copyright
28 43 29 20 31 39 39 33 2D 32 30 30 33 20 54 68 ; (C) 1993-2003 Th
65 20 4D 6F 6E 6F 74 79 70 65 20 43 6F 72 70 6F ; e Monotype Corpo
72 61 74 69 6F 6E 2E 20 41 6C 6C 20 72 69 67 68 ; ration. All righ
74 73 20 72 65 73 65 72 76 65 64 2E 01 04 02 61 ; ts reserved....a
47 54 68 20 00 01 00 00 00 08 00 80 00 03 00 00 ; GTh .......O....
67 64 69 72 00 00 00 00 00 00 00 00 00 00 00 00 ; gdir............
63 76 74 20 FA 52 36 BB 00 00 00 8C 00 00 10 94 ; cvt ?R6?..?..?
66 70 67 6D 61 C5 DF 19 00 00 11 20 00 00 07 90 ; fpgma?.... ...?
68 65 61 64 D3 87 80 97 00 00 18 B0 00 00 00 36 ; head?O?..?..6
68 68 65 61 11 A4 D6 51 00 00 18 E8 00 00 00 24 ; hhea.??Q...?..$
68 6D 74 78 FE 69 98 29 00 00 19 0C 00 03 3C 2C ; hmtx??.....<,
6D 61 78 70 D7 96 08 CB 00 03 55 38 00 00 00 20 ; maxp?.?.U8...
70 72 65 70 DA EE 17 43 00 03 55 58 00 00 12 C7 ; prep?.C..UX...?
```

METHOD AND APPARATUS FOR PERFORMING DIRECT PRINTING BY ANALYZING THE BYTES OF THE PRINT DATA

CROSS-REFERENCE TO RELATED APPLICATIONS

This application claims priority under 35 U.S.C. §119 from Korean Patent Application No. 10-2011-0110072, filed on Oct. 26, 2011, in the Korean Intellectual Property Office, the disclosure of which is incorporated herein by reference in its entirety.

BACKGROUND

1. Field

The present general inventive concept relates to a method and apparatus to perform direct printing.

2. Description of the Related Art

A conventional image forming apparatus, such as a printer or multi-function peripheral device, may perform at least one function from among printing print data, copying a document, scanning a document, sending and receiving fax, and transmitting email. When a user prints a document by using the image forming apparatus, a user may directly transmit print data of the document to the image forming apparatus without having to use a driver module so as to perform direct printing of the print data.

SUMMARY

The present general inventive concept provides an image forming apparatus and a method of performing direct printing of print data, and a computer readable recording medium having recorded thereon a program to execute the method.

Additional features and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of performing direct printing of print data in an image forming apparatus, the method including receiving print data encoded in a first encoding method, determining whether the print data includes a character expressed in 2 bytes, converting the print data encoded in the first encoding method to be encoded in a second encoding method to analyze the character expressed in 2 bytes in the image forming apparatus, if the print data includes the character expressed in 2 bytes, and forming an image of the converted print data.

The method may further include generating a command of parsing the converted print data in units of 2 bytes when the print data is converted, and adding the generated command to the converted print data.

The method of may further include identifying a type of language of the character expressed in 2 bytes by analyzing the print data if the print data includes the character expressed in 2 bytes.

The method may further include determining whether there is at least one font providing the identified language from among pre-stored fonts of the image forming apparatus according to a result of the identifying, generating a command to print the converted print data in the at least one font if there is the at least one font providing the identified language, and adding the generated command to the converted print data.

The method may further include indicating to a user that the received print data is data that is not printable if there is not at least one font providing the identified language.

The determining may include determining whether the print data includes the character expressed in 2 bytes by parsing the print data.

The method may further include receiving at least one font from an external device, and storing the received at least one font and language information about the received at least one font, wherein the determining of whether there is at least one font providing the identified language is performed based on the stored language information.

The image forming apparatus may determine language information supported by the received font by parsing character code information of the received font.

The first encoding method may be an American Standard Code for Information Interchange (ASCII) code, and the second encoding method is a Unicode.

The command may be a printer command language (PCL).

The foregoing and/or other aspects and utilities of the present general inventive concept may also be achieved by providing a computer readable recording medium having embodied thereon a computer program to execute a method of performing direct printing of print data in an image forming apparatus, wherein the method includes receiving print data encoded in a first encoding method, determining whether the print data includes a character expressed in 2 bytes, converting the print data encoded in the first encoding method to be encoded in a second encoding method to analyze the character expressed in 2 bytes in the image forming apparatus, if the print data includes the character expressed in 2 bytes, and forming an image of the converted print data.

The foregoing and/or other aspects and utilities of the present general inventive concept may also be achieved by providing an image forming apparatus to perform direct printing of print data, the image forming apparatus including a communication interface unit to receive print data encoded in a first encoding method, a first determiner to determine whether the print data includes a character expressed in 2 bytes, and a converter to convert the print data encoded in the first encoding method to be encoded a second encoding method of analyzing the character expressed in 2 bytes in the image forming apparatus, if it is determined by the first determiner that the print data includes the character expressed in 2 bytes.

The image forming apparatus may further include a command generator to generate a command to parse the converted print data in units of 2 bytes if the converter converts the print data, and to add the generated command to the converted print data.

The image forming apparatus may further include an analyzer to analyze the print data to identify a type of language of the character expressed in 2 bytes, if the first determiner determines that the print data includes the character expressed in 2 bytes.

The image forming apparatus may further include a second determiner to determine whether there is at least one font providing the identified language from among pre-stored fonts of the image forming apparatus according to a result of the analyzing by the analyzer, and a command generator to generate a command of printing the converted print data in the at least one font and adding the generated command to the converted print data, if the second determiner determines that there is the at least one font providing the identified language.

The image forming apparatus may further include a user interface unit to indicate to a user that the received print data is not printable if the second determiner determines that there is not at least one font providing the identified language.

The first determiner may determine whether the print data includes the character expressed in 2 bytes by parsing the print data.

The image forming apparatus may further include a font manager to receive at least one font from an external device through the communication interface unit, obtain language information supported by the received font by parsing character code information of the received font, and manage font information including the language information along with the received font, wherein the second determiner determines whether there is at least one font providing the identified language based on the language information of the font manager.

The first encoding method may be an American Standard Code for Information Interchange (ASCII) code, and the second encoding method is Unicode.

The foregoing and/or other aspects and utilities of the present general inventive concept may also be achieved by providing an image forming apparatus to perform direct printing of print data, the image forming apparatus including a communication interface unit to receive print data encoded in an American Standard Code for Information Interchange (ASCII) code, a first determiner to determine whether the print data includes a character expressed in 2 bytes, a converter to convert the print data encoded in the ASCII code to be encoded in Unicode, a command generator to generate a command to parse the converted print data in units of 2 bytes if the first determiner determines that the print data includes the character expressed in 2 bytes, and an image forming unit to form an image of the converted print data according to the generated command.

BRIEF DESCRIPTION OF THE DRAWINGS

The above and other features and utilities of the present general inventive concept will become more apparent by describing in detail exemplary embodiments thereof with reference to the attached drawings in which:

These and/or other features and utilities of the present general inventive concept will become apparent and more readily appreciated from the following description of the embodiments, taken in conjunction with the accompanying drawings of which:

FIG. 4A is a table illustrating American Standard Code for Information Interchange (ASCII) code values corresponding to a first encoding method of print data received by an image forming apparatus, according to an exemplary embodiment of the present general inventive concept;

FIG. 4B is a table illustrating ASCII code values of Korean print data received by an image forming apparatus, according to an exemplary embodiment of the present general inventive concept;

FIG. 5A illustrates header information of a font received by a font manager, according to an exemplary embodiment of the present general inventive concept;

FIG. 5B illustrates character codes of a font received by a font manager, according to an exemplary embodiment of the present general inventive concept;

DETAILED DESCRIPTION OF THE PREFERRED EMBODIMENTS

Figure 1:
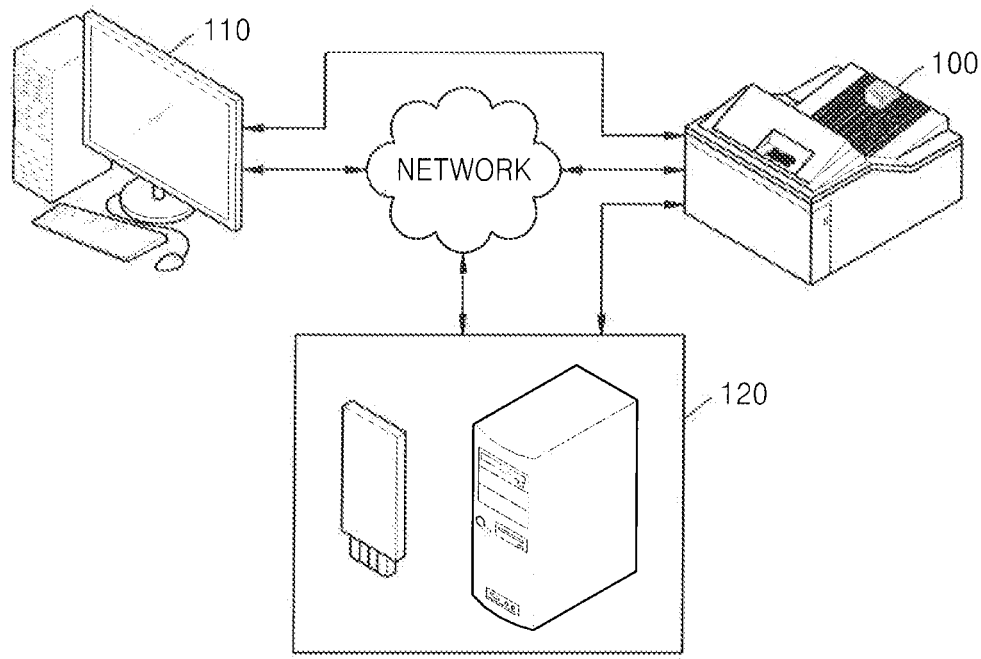
FIG. 1 is a diagram of an environment in which an image forming apparatus is used, according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram of an environment in which an image forming apparatus 100 is used, according to an exemplary embodiment of the present general inventive concept. Referring to FIG. 1, the image forming apparatus 100 may be connected to a host device 110 or an external device 120. Although FIG. 1 illustrates only one image forming apparatus 100, one host device 110, and one external device 120, the present general concept is not limited thereto and alternatively, a plurality of host devices 110 and a plurality of external devices 120 may be connected to a plurality of image forming apparatuses 100.

Referring to FIG. 1, the image forming apparatus 100, the host device 110, and the external device 120 may transmit and receive data through a wired or wireless network or via wired serial communication by using their own communication modules. Examples of a network include the Internet, a local area network (LAN), a wireless LAN, a wide area network (WAN), and a personal area network (PAN), but are not limited thereto, and may include various other types of networks that transmit and receive information.

The image forming apparatus 100 of FIG. 1 is an apparatus to form an image, and may include a printer, a scanner, or a multi-function peripheral (MFP). Accordingly, image forming apparatus 100 may perform a printing operation, a scanning operation, a copying operation, a fax transmitting and receiving operation, an email transmitting operation, and a file transmitting operation to transmit a file to a server, but functions of the image forming apparatus 100 are not limited thereto, and the image forming apparatus 100 may perform various other operations according to a use environment.

Also, the image forming apparatus 100 of FIG. 1 performs direct printing of print data, which will be described later with reference to FIG. 2.

The host device 110 may control the image forming apparatus 100. Examples of the host device 110 include all devices capable of controlling the image forming apparatus 100, such as a general-purpose computer system or a personal digital assistant (PDA), by being connected to the image forming apparatus 100. The host device 110 of FIG. 1 transmits a text document to the image forming apparatus 100 without requiring a driver module of the image forming apparatus 100 to be used.

Examples of the external device 120 include all devices connected to the image forming apparatus 100 through a wired or wireless network or via wired serial communication. For example, the external device 120 may include a storage device, such as a universal serial bus memory, but may also include a general-purpose computer system existing on a network, a server device, a digital living network alliance (DLNA) device, or a web server, but is not limited thereto. The external device 120 according to the current embodiment may store a text document. The external device 120 transmits the text document to the image forming apparatus 100.

Here, the text document denotes a document file storing information in a text form, such as a character of a language, a number, or a symbol, and corresponds to the print data in direct printing.

When a user is to print the text document according to the current embodiment, the text document is transmitted to the image forming apparatus 100 connected to the host device 110 without requiring installation of a driver of the image forming apparatus 100.

The image forming apparatus 100 receives the text document from the host device 110, or receives the text document stored in the external device 120 from the external device 120. Accordingly, the image forming apparatus 100 performs direct printing of the text document received from at least one of the host device 110 and the external device 120.

Figure 2:
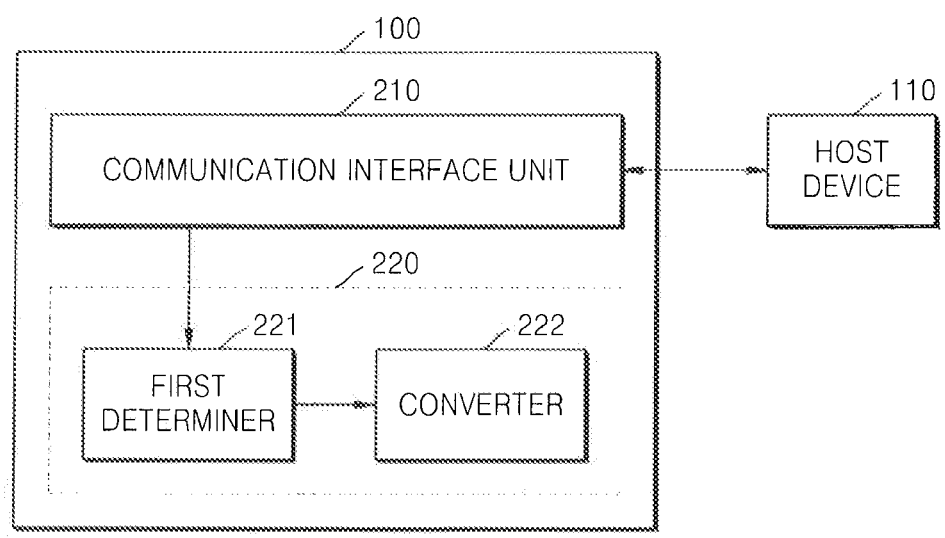
FIG. 2 is a block diagram of an image forming apparatus to perform direct printing of print data, according to an exemplary embodiment of the present general inventive concept.

FIG. 2 is a block diagram of the image forming apparatus 100 performing direct printing of print data, according to an exemplary embodiment of the present general inventive concept. Referring to FIG. 2, the image forming apparatus 100 includes a communication interface unit 210 and a processor 220, such that the processor 220 includes a first determiner 221 and a converter 222.

The image forming apparatus 100 of FIG. 2 may include other general-purpose or conventional elements (not illustrated) besides the elements illustrated in FIG. 2.

The communication interface unit 210 receives print data encoded in a first encoding method. The first encoding method is a method of encoding the print data transmitted by the host device 110 or the external device 120 in a direct printing environment.

According to FIG. 2, the host device 110 does not transmit the print data in an image form, but transmits the print data of which a text is encoded, in the direct printing environment. Here, encoding is performed to prepare a series of character systems by adding a uniform number to a character to perform information exchange in a computer or the like, and may be American Standard Code for Information Interchange (ASCII) code or Unicode, but is not limited thereto.

The first encoding method according to the current embodiment is a code system to encode a character by using codes less than or equal to 1 byte, and may be realized in an ASCII code that is a code system to encode a character, such as an English character or a number, to a code of 7 bits, but is not limited thereto.

The print data according to the current embodiment may be a text document file or text prepared or executed in the host device 110 connected to the image forming apparatus 100, but is not limited thereto, and may be a text document file or text stored in the external device 120 connected to the image forming apparatus 100.

Also, the communication interface unit 210 transmits and receives data to and from the host device 110 or external device 120 through a local network or the like.

The processor 220 processes the print data received through the communication interface unit 210 such that the print data is printable by an image forming unit.

The first determiner 221 and the converter 222 included in the processor 220 according to the current embodiment may each correspond to any one of a software module or hardware module included in the processor 220.

Upon receiving the print data, the first determiner 221 determines whether the print data includes a character expressed in 2 bytes.

Here, the character expressed in 2 bytes denotes a character that requires 2 bytes to express each character in code. In an example of an ASCII code, ASCII codes of Korean characters '가', '나', '다', and '라' respectively have hexadecimal (hex) values of 'B0A1', 'B3AA', 'B4D9', and 'B6F3', which are each expressed in 2 bytes. Meanwhile, ASCII codes of numbers '1', '2', '3' and English characters '1', '2', '3', '4', 'A', 'B', 'C', 'D', 'a', 'b', 'c', and 'd' respectively have hex values of '31', '32', '33', 34', '41', '42', '43', '44', '61', '62', '63', and '64', which are each expressed in 7 bits.

Here, the ASCII code expressing a Korean character is a code expressing a Korean character or a Chinese character in 2 bytes so as not to conflict with the ASCII code expressed in 7 bits and may be a Korean standard character set (KS C 5601).

Examples of the character expressed in 2 bytes include Korean, Chinese, and Japanese hiragana. Accordingly, the first determiner 221 may determine whether the received print data includes a character expressed in 2 bytes, such as Korean, Chinese, or Japanese hiragana.

The converter 222 converts the print data encoded in the first encoding method to be encoded in a second encoding method if the first determiner 221 determines that the print data includes the character expressed in 2 bytes.

If the first determiner 221 determines that the print data does not include the character expressed in 2 bytes, for example, if the print data includes only English characters and numbers, the image forming apparatus 100 parses the print data in units of 1 byte according to a basic setting, and prints characters to which parsed data is mapped according to its encoding method.

If the first determiner 221 determines that the print data includes the character expressed in 2 bytes, the converter 222 converts the print data encoded in the first encoding method to be encoded in the second encoding method.

The second encoding method according to the current embodiment is a code system of encoding a character by using codes of 2 bytes, and corresponds to a method of interpreting the character expressed in 2 bytes, which is performed by the image forming apparatus 100. Here, the second encoding method may be realized in Unicode or universal character set (UCS) transformation format-8 (UTF-8), which is a code system of encoding a character, such as an English or Korean character, to a code of 2 bytes, but is not limited thereto.

During direct printing, print data corresponding to a text is printed by transmitting the print data from the host device 110 or external device 120 to the image forming apparatus 100, without being required to use a driver module. However, since the print data transmitted without using the driver module does not include a print command recognized by the image forming apparatus 100, the image forming apparatus 100 recognizes the print data in units of 1 byte according to the basic setting (i.e. a setting that is performed by a conventional image forming apparatus).

For example, when the image forming apparatus 100 performs direct printing of Korean characters '가' and '나' the image forming apparatus 100 parses and recognizes transmitted print data in units of 1 byte according to the basic setting, if the image forming apparatus 100 does not determine whether the received print data includes the character expressed in 2 bytes.

Accordingly, the image forming apparatus 100 parses 'B0A1' and 'B3AA' corresponding to the ASCII codes of '가' and '나' as 'B0', 'A1', 'B3', and 'AA' that are units of 1 bytes, and outputs incorrect and unwanted data such as '괴 ¬'. In other words, a conventional image forming apparatus cannot recognize foreign characters without an installed corresponding driver, thereby resulting in outputting incorrect and unwanted print data due to improper encoding.

Accordingly, the image forming apparatus 100 according to FIG. 2 determines whether the received print data includes the character expressed in 2 bytes by using the first determiner 221, and converts the print data encoded in the first encoding method to be encoded in the second encoding method so that the print data is interpretable when it is the character expressed in 2 bytes, thereby preventing the print data including the character expressed in 2 bytes from being improperly printed.

Figure 3:
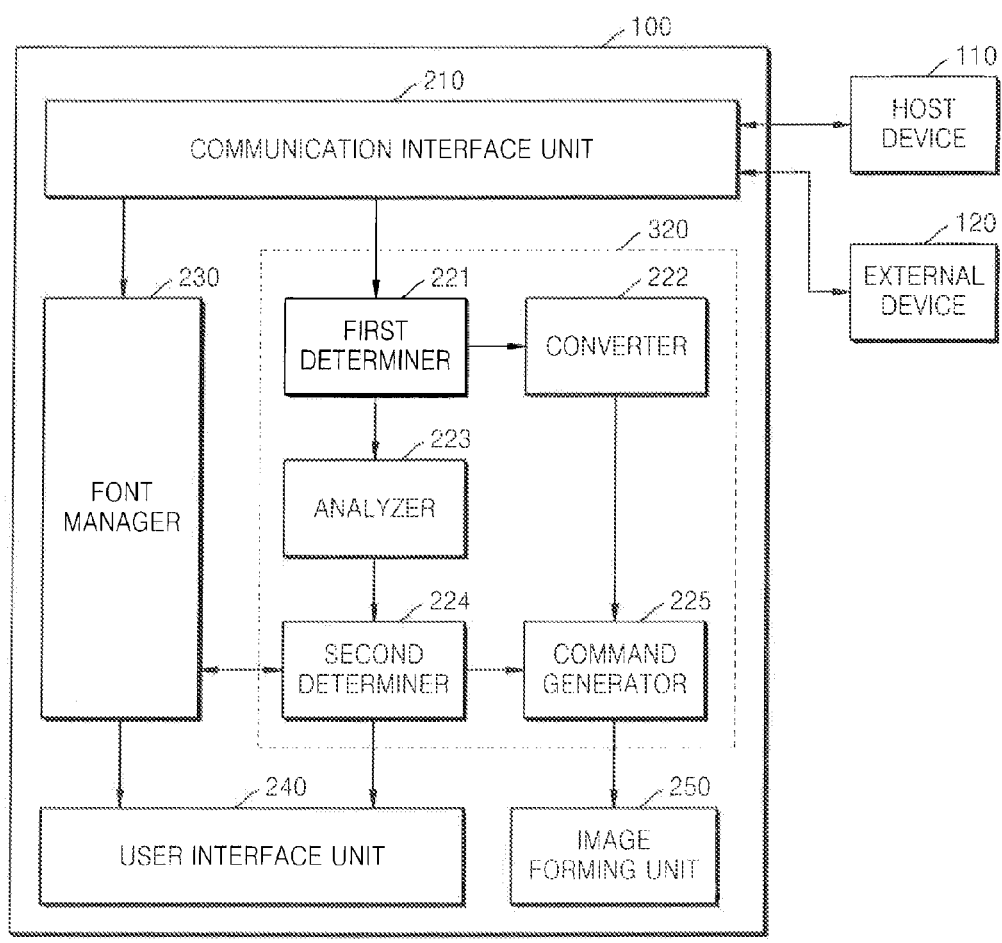
FIG. 3 is a block diagram of an image forming apparatus to perform direct printing of print data, according to another exemplary embodiment of the present general inventive concept.

FIG. 3 is a block diagram of the image forming apparatus 100 to perform direct printing of print data, according to another exemplary embodiment of the present general inventive concept. Referring to FIG. 3, the image forming apparatus 100 includes the communication interface unit 210, a processor 320, a font manager 230, a user interface unit 240, and an image forming unit 250, wherein the processor 320 includes the first determiner 221, the converter 222, an analyzer 223, a second determiner 224, and a command generator 225.

The image forming apparatus 100 of FIG. 3 may include other general-purpose or conventional elements (not illustrated) besides the elements illustrated in FIG. 3.

The image forming apparatus 100 of FIG. 3 corresponds to an embodiment of the image forming apparatus 100 of FIG. 2. Thus, details described with reference to FIGS. 1 and 2 are applicable to the image forming apparatus 100 of FIG. 3. The communication interface unit 210, the first determiner 221, and the converter 222 of FIG. 2 are respectively identical to the communication interface unit 210, the first determiner 221, and the converter 222 of FIG. 3, and thus details thereof will not be repeated herein. Elements of the image forming apparatus 100 according to the current embodiment are not limited to those illustrated in FIG. 3.

The communication interface unit 210 receives the print data encoded in the first encoding method as described above with reference to FIG. 2. Also, the communication interface unit 210 receives at least one font from the external device 120.

The communication interface unit 210 may transmit and receive data to and from the host device 110 or external device 120 through a local network or the like.

The processor 320 of FIG. 3 processes the print data received through the communication interface unit 210 such that the print data is printable by the image forming unit 250.

Upon receiving the print data as described above with reference to FIG. 2, the first determiner 221 determines whether the received print data includes a character expressed in 2 bytes.

For example, the first determiner 221 may determine whether the print data includes the character expressed in 2 bytes by parsing the received print data. This will be described in detail later with reference to FIGS. 4A and 4B.

Here, the parsing performed by the first determiner 221 is not done to output the print data but to determine whether the print data includes the character expressed in 2 bytes, and may be performed only on a part of the print data.

As described above with reference to FIG. 2, the converter 222 converts the print data encoded in the first encoding method to be encoded in the second encoding method, if the first determiner 221 determines that the print data includes the character expressed in 2 bytes.

Here, the second encoding method corresponds to a method of interpreting the character expressed in 2 bytes, which is performed by the image forming apparatus 100, and may be realized in Unicode or UTF-8, but is not limited thereto.

In order to convert the print data encoded in the first encoding method to be encoded in the second encoding method, the converter 222 may convert the print data encoded in the first encoding method to be encoded in a third encoding method and convert print data encoded in the third encoding method to be encoded in the second encoding method.

An example of the image forming apparatus 100 using PCL 5 enhanced (5E) emulation and performing direct printing of print data including Korean characters '가' and '나' will now be described.

The image forming apparatus 100 according to FIG. 3 may form an image of the print data by using the PCL 5E emulation and print the image, wherein the PCL 5E emulation is used to interpret the print data encoded in UTF-8.

The image forming apparatus 100 using the PCL 5E emulation receives the print data encoded in the first encoding method through the communication interface unit 210. Here, if the first encoding method is ASCII code, the communication interface unit 210 receives the print data of 'B0A1' and 'B3AA'.

The first determiner 221 determines that the received print data includes the character expressed in 2 bytes. According to the determination of the first determiner 221, the converter 222 may first convert the print data encoded in the ASCII code to be encoded in Unicode before converting the print data to be encoded in UTF-8 that is a method interpretable in the PCL 5E emulation.

In other words, the print data 'B0A1' and 'B3AA' in the ASCII code are respectively converted to 'AC00' and 'B098' corresponding to '가' and '나' in Unicode. Also, the converter 222 converts the print data encoded in Unicode to be encoded in UTF-8. Thus, the print data 'AC00' and 'B098' encoded in Unicode are respectively converted to 'EAB080' and 'EB8298' corresponding to '가' and '나' in UTF-8.

If first determiner 221 determines that the print data includes the character expressed in 2 bytes, the analyzer 223 analyzes the print data so as to identify a type of a language of the character expressed in 2 bytes.

For example, the analyzer 223 may identify the type of the language of the character expressed in 2 bytes by parsing the received print data. This will be described in detail later with reference to FIGS. 4A and 4B.

The second determiner 224 determines whether there is at least one font corresponding to the identified language from among pre-stored fonts of the image forming apparatus 100, according to the analysis of the analyzer 223.

If the second determiner 224 determines that there is not at least one font supporting the identified language, the second determiner 224 outputs a signal indicating the determination result to the user interface unit 240 so as to notify a user that the received print data is not printable.

If the second determiner 224 determines that there is the at least one font supporting the identified language, the second determiner 224 outputs information about the at least one font to the command generator 225 so that the print data is printed by using the at least one font.

Here, if there are one or more fonts supporting the identified language, the second determiner 224 outputs information about the one or more fonts to the user interface unit 240 so as to receive one font desired to be printed by the user.

The command generator 225 generates a command to parse the converted print data in units of 2 bytes in response to conversion of the print data by the converter 222.

If the print data includes the character expressed in 2 bytes, the image forming apparatus 100 parses the converted print data in units of 2 bytes and prints the parsed print data so as to normally print the print data.

Here, the command generator 225 generates the command to parse the converted print data in units of 2 bytes so that the image forming unit 250 parses the character expressed in 2 bytes in the units of 2 bytes. The command generated by the command generator 225 is a command interpretable by the image forming unit 250, and may be realized in a printer command language (PCL), but is not limited thereto.

Also, if the second determiner 224 determines that there is at least one font providing the language identified by the analyzer 223, the command generator 225 generates a command to print the print data in the at least one font.

Here, if a font used when printing the print data does not support the language of the character expressed in 2 bytes, the image forming apparatus 100 is unable to print the normal print data. Thus, the second determiner 224 determines whether there is a font providing the language identified by the analyzer 223, and the command generator 225 generates the command to print the print data in the font providing the identified language. Here, the command is interpretable by the image forming unit 250 as described above.

The command generator 225 adds the command generated as such to the print data converted by the converter 222. The print data with the command is transmitted to and printed by the image forming unit 250.

When the image forming apparatus 100 using the PCL 5E emulation performs direct printing of the print data including Korean characters '가' and '나', the command generator 225 generates a PCL 5E command that is interpretable by the PCL 5E emulation.

For example, the image forming apparatus 100 receives the print data corresponding to Korean characters '가' and '나' encoded in the first encoding method through the communication interface unit 210, and the first determiner determines that the received print data includes the character expressed in 2 bytes.

As described above, the converter 222 converts the print data encoded in the first encoding method to be encoded in UFT-8 interpretable by the PCL 5E emulation. Accordingly, the command generator 225 generates (esc)&t1008P that is the PCL 5E command to parse the converted print data in units of 2 bytes. The command generator 225 adds the generated command (esc)&t1008P to the print data 'EAB080EB8298' encoded in UTF-8.

Also, the analyzer 223 identifies that the type of the language of the character expressed in 2 bytes is Korean by analyzing the print data. The second determiner 224 determines whether there is at least one font providing Korean from among the pre-stored fonts of the image forming apparatus 100.

Here, if there is at least one font providing Korean from among the pre-stored fonts of the image forming apparatus 100, the command generator 225 generates (esc)(#X that is a PCL 5E command to print the print data in the corresponding font. Here, # denotes font identification (ID). Herein, the font ID for Korean is 3, and thus the PCL 5E command is indicated as (esc)(3X. The command generator 225 adds the generated command (esc)(3X to the print data to which the command to parse in units of 2 bytes is added.

After adding the generated command to converted print data, the command generator 225 transmits final print data to the image forming unit 250. The PCL 5E emulation of the image forming unit 250 receives such print data with the added command, forms an image of '가' and '나', and prints the image.

The font manager 230 receives at least one font from the external device 120 through the communication interface unit 210, obtains language information supported by the at least one font by parsing character code information of the at least one font, and manages font information including the language information obtained with the at least one font.

For example, the font manager 230 receives a font from the external device 120, and obtains font information by parsing header information of the received font. Here, the font information may include font ID, a font typeface, a font symbol set, and a font name.

The font manager 230 may determine whether the font received from the external device 120 includes the character expressed in 2 bytes besides managing the font information that is basically provided and manage font information obtained as a result of the determination. Also, the font manager 230 may parse character code information of the font to manage the language information supported by the font. This will be described in detail later with reference to FIG. 5.

The font manager 230 manages the language information of the font received from the external device 120, and provides the language information to the second determiner 224. Accordingly, the second determiner 224 may determine whether there is a font supporting the language of the received print data by referring to the language information of the font manager 230.

The font manager 230 may include a memory (not illustrated) to store the font received from the external device 120, the font information, and the language information. It will be obvious to one of ordinary skill in the art that the memory may include any type of conventional storage medium, such as a random access memory (RAM), a flash memory, database, or a memory card, but is not limited thereto.

The user interface unit 240 indicates to the user that the received print data is not printable if the second determiner 224 determines that there is not at least one font providing the language identified by the analyzer 223.

Accordingly, the user may recognize that the received print data is not printable through the user interface unit 240 without having to print the print data. Accordingly, paper and ink are conserved by preventing incorrect and unwanted print data from being printed.

The user interface unit 240 of FIG. 3 displays output information to the user, and may include any type of output device, such as a display panel, a touch screen, or a speaker, but is not limited thereto, as well as a software module to drive the respective output device based on its type.

Referring to FIG. 3, the image forming unit 250 forms an image of the print data to be printed obtained from the processor 320, and prints the image on a print paper. In detail, the image forming unit 250 receives the converted print data, and forms an image of the print data according to a command added to the print data.

The image forming unit 250 according to FIG. 3 may include hardware units to perform charging, exposure, developing, transferring, and fixing to perform the printing, and a software module to drive the hardware units.

According to the image forming unit 250 using the PCL 5e emulation described above, the print data includes the command of (esc)(3x(esc)&t1008P according to the determination of the first and second determiners 221 and 224.

The PCL 5e emulation of the user interface unit 240 interprets the PCL 5e command included in the print data to parse the print data encoded in UTF-8 in units of 2 bytes. Also, the PCL 5e emulation maps characters corresponding to the parsed print data and performs printing by forming an image of the characters in the font directed by the PCL 5e command.

While performing the direct printing of the print data, the image forming apparatus 100 of FIG. 3 determines whether the received print data includes the characters expressed in 2 bytes so as to prevent incorrect and unwanted data from being printed as the received print data is parsed and printed in units of 1 byte according to a basic setting.

Also, the image forming apparatus 100 according to FIG. 3 identifies the type of the language of the characters expressed in 2 bytes included in the print data by analyzing the received print data, and determines whether there is a font supporting the identified language.

Accordingly, the printing is not performed if there is no font supporting the received print data in the image forming apparatus 100, thereby conserving ink and paper by preventing incorrect and unwanted print data from being printed.

Figure 4B:
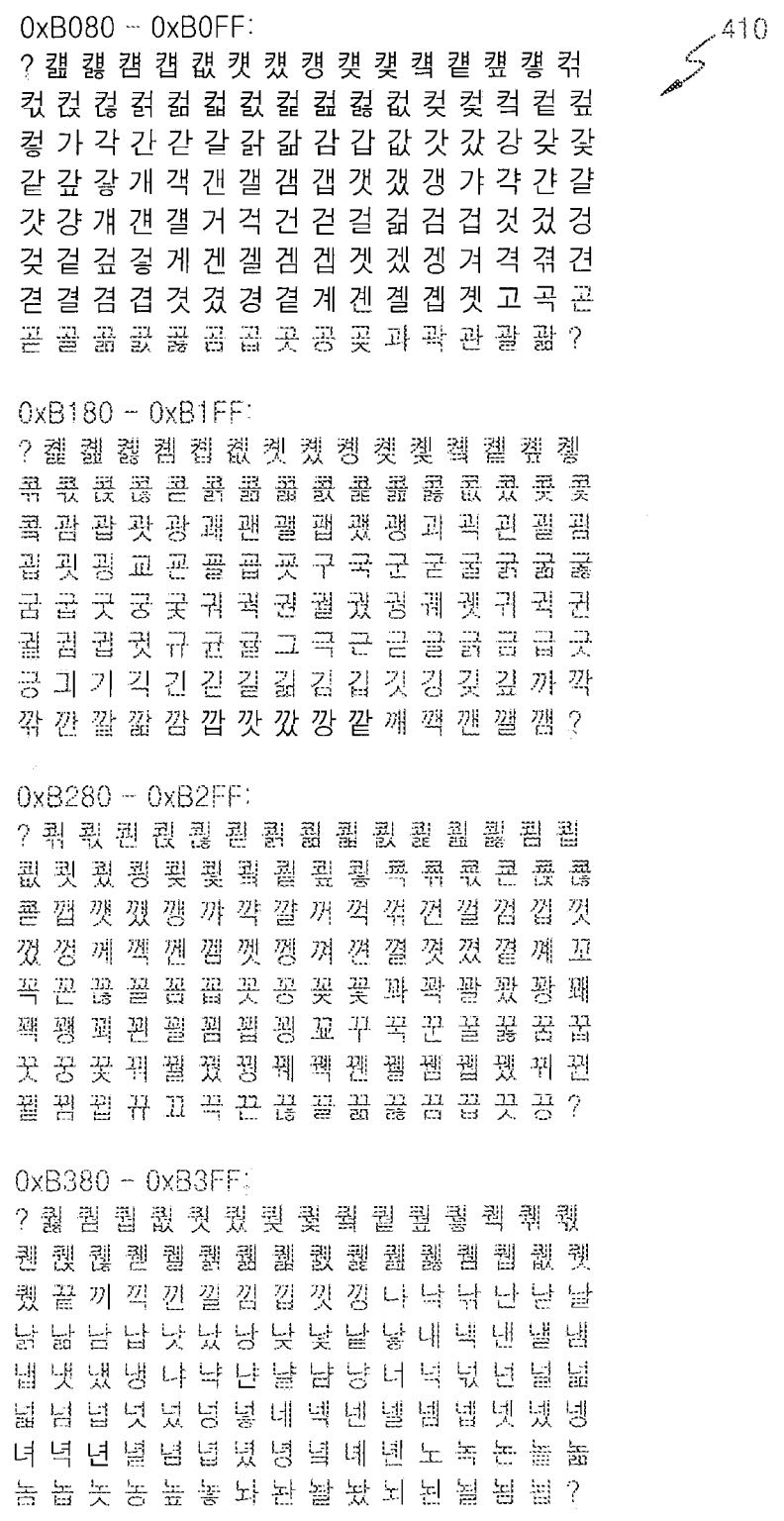

FIG. 4A is a table illustrating ASCII code values 400 corresponding to the first encoding method of the print data received by the image forming apparatus 100, according to an exemplary embodiment of the present general inventive concept, and FIG. 4B is a table illustrating Korean ASCII code values 410 of the print data received by the image forming apparatus 100, according to an exemplary embodiment of the present general inventive concept.

As described above with reference to FIG. 3, the first determiner 221 determines whether the received print data includes the character expressed in 2 bytes. According to FIGS. 3 and 4A, the first determiner 221 may determine whether the print data includes the character expressed in 2 bytes by parsing the received print data.

According to an example of ASCII code, the first determiner 221 parses the print data encoded in ASCII code.

Referring to FIG. 4A, English characters and numbers are each expressed in 7 bits in ASCII code, and ASCII code values of English characters and numbers have values from 00 (0) to 7F (127) as hex values. Here, figures in parenthesis refer to values in the decimal number system.

Meanwhile, referring to FIG. 4B, an ASCII code value requires 2 bytes to express a Korean character, and has a value from B0A1 (45217) to C8FE (51454) as a hex value.

Here, if the character expressed in 2 bytes is parsed in units of 1 byte, the character includes a value such as 'B0 (176)' or 'A1 (161)'. Accordingly, the first determiner 221 may determine that the print data includes the character expressed in 2 bytes if the print data parsed in units of 1 byte has a value equal to or above '7F (127)'.

For example, when the image forming apparatus 100 performs direct printing of print data including Korean characters '가나다라', the image forming apparatus 100 receives the print data encoded in the first encoding method through the communication interface unit 210.

Here, if the first encoding method is ASCII code, the communication interface unit 210 receives the print data of 'B0A1B3AAB4D9B6F3'. According to an embodiment of the present invention, the first determiner 221 parses the received print data 'B0A1B3AAB4D9B6F3' in units of 1 byte, and recognizes the parsed print data as 'B0/A1/B3/AA/B4/D9/B6/F3'. Since a value equal to or above '7F' is included in the received print data, the first determiner 221 determines that the print data includes the character expressed in 2 bytes.

The first determiner 221 may determine whether the received print data includes the character expressed in 2 bytes by using the algorithm described above, but the algorithm is not limited thereto as long as it is determined whether the print data includes the character expressed in 2 bytes.

Also, as described above with reference to FIG. 3, the analyzer 223 analyzes the print data to identify the type of language of the character expressed in 2 bytes. Accordingly, the analyzer 223 identifies the type of language of the character expressed in 2 bytes by parsing the received print data.

If the first determiner 221 determines that the print data includes the character expressed in 2 bytes, the analyzer 223 analyzes the print data by parsing the print data in units of 2 bytes.

According to ASCII code, a Korean ASCII code value has a value from B0A1 (45217) to C8FE (51454) in a hex value. Meanwhile, a Chinese ASCII code value has a value from CAA1 (51873) to FDFE (65022) in a hex value. Also, a Japanese hiragana or katakana ASCII code value has a value from AAA1 (43681) to ABFE (44030).

Accordingly, if the analyzer 223 parses the print data in units of 2 bytes and the parsed print data has a value from B0A1 (45217) to C8FE (51454), the character expressed in 2 bytes in the print data may be identified as Korean.

The analyzer 223 may identify the type of language of the character expressed in 2 bytes by analyzing the print data using the algorithm described above, but another type of algorithm may be used as long as the type of language is identified by analyzing the print data.

FIG. 5A illustrates header information 510 of a font received by the font manager 230, according to an exemplary embodiment of the present general inventive concept.

As described above with reference to FIG. 3, the font manager 230 obtains the language information supported by the font by parsing the character code information of the font received from the external device 120, and manages the font information including the language information along with the received font.

The font manager 230 may obtain the font information by parsing the header information 510 of the font. The font information may include font ID, a font typeface, a font symbol set, and a font name.

Referring to FIG. 5A, values '1B 2A 63 33 44 . . . 00 00 00' indicated on the left are hex values of the header information 510 of the font encoded in Unicode. Here, Unicode is only an example, and the header information 510 may be encoded in a type of encoding method other than Unicode.

The result that the hex values on the left are mapped to corresponding characters is illustrated on a right portion of FIG. 5A, and the header information 510 illustrates that the font name is "Andale Mono WT" and the font ID is "3".

Also, the font manager 230 may determine whether the font supports the character expressed in 2 bytes by using the parsed header information 510 of the font.

The font manager 230 may read a last code from the header information 510 and determine that the font includes the character expressed in 2 bytes if the last code has a value higher than 'FF'. Accordingly, the font manager 230 may manage not only basic information of the font, such as the font ID and font name, but also the font information indicating whether the font supports the character expressed in 2 bytes.

Figure 5B:
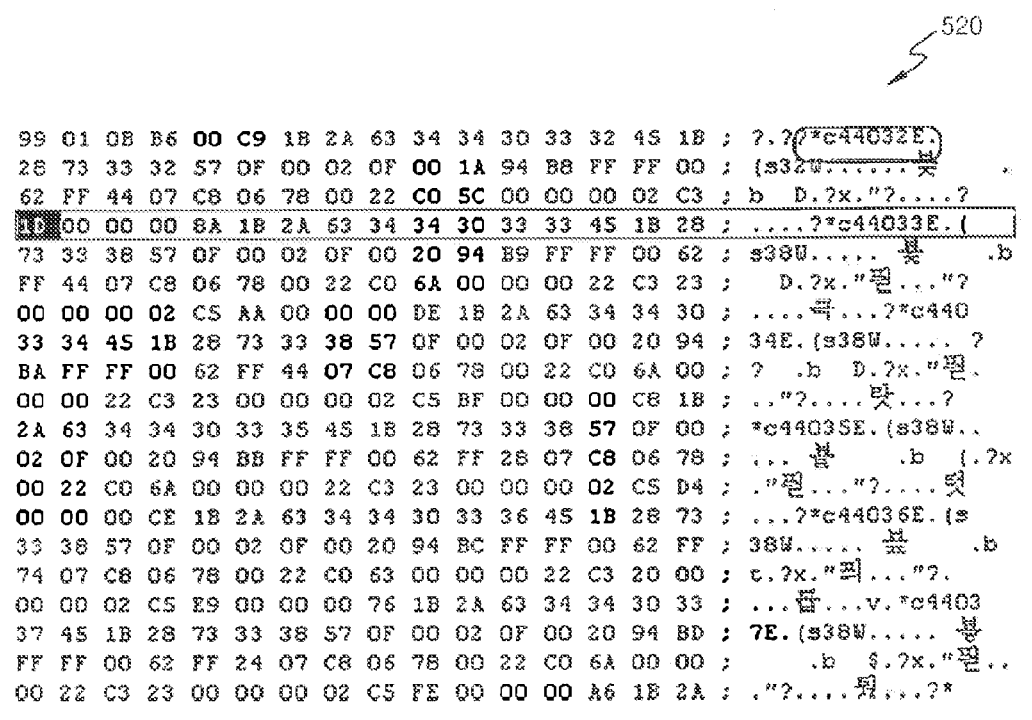

FIG. 5B illustrates character code information 520 of the font received by the font manager 230, according to an exemplary embodiment of the present general inventive concept. The font manager 230 obtains the language information supported by the font by parsing the character code information 520 of the font.

Referring to FIG. 5B, values '99 01 0B B6 00 . . . A6 1B 2A' on the left are the character code information 520 of the font encoded in Unicode expressed in hex values. Here, the Unicode is only an example and the font may be encoded by another encoding method.

The result that the hex values on the left are mapped to corresponding characters is illustrated on a right portion of FIG. 5B, and the character code information 520 of the font includes characters of which character code IDs are "44032", "44033", "44034", and "44035". The character code IDs are values of Unicode corresponding to Korean characters of '가', '나', '다', and '라'. Thus, the character code information 520 illustrates that the received font is a font supporting Korean.

Accordingly, the font manager 230 may read the character code ID from the character code information 520 of the received font, identify the language corresponding to the character code ID and obtain the language information supported by the font.

The font manager 230 may identify the type of language supported by the font by using the above algorithm, but another type of algorithm may be used.

The font manager 230 manages the font information including the language information obtained as above along with the font. The font manager 230 provides the font information including the language information to the second determiner 224 so that the second determiner 224 refers to the font information to determine whether there is a font supporting the language of the print data.

Figure 6:
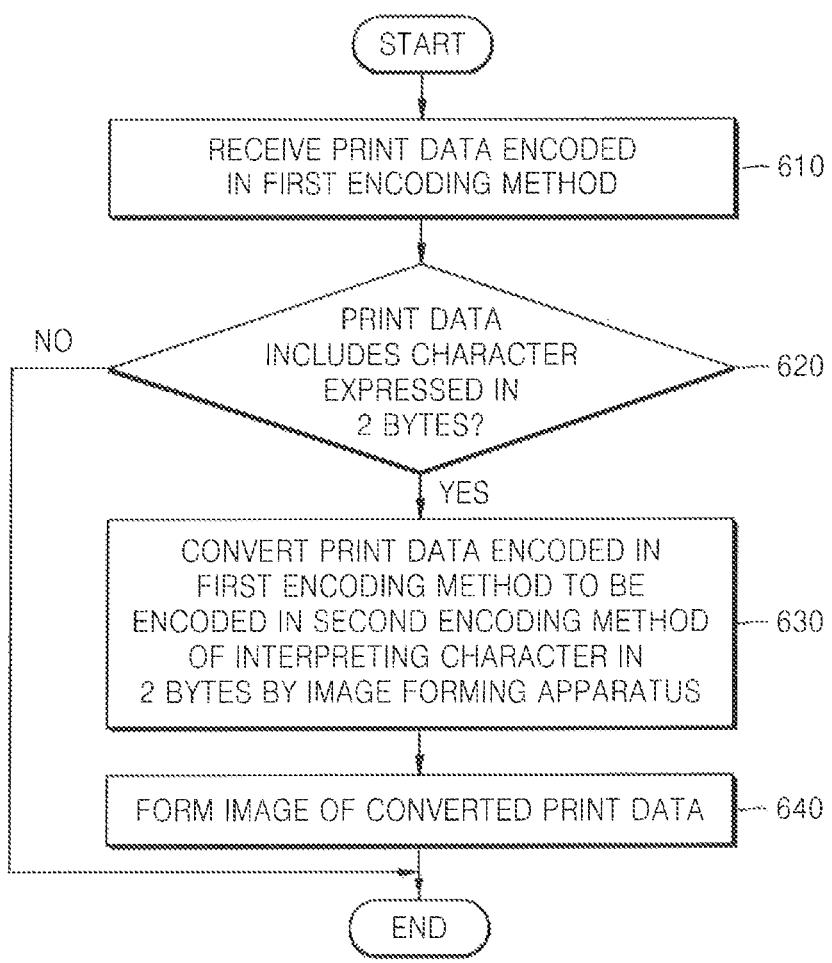
FIG. 6 is a flowchart illustrating a method of performing direct printing of print data by an image forming apparatus, according to an exemplary embodiment of the present general inventive concept.
Figure 7:
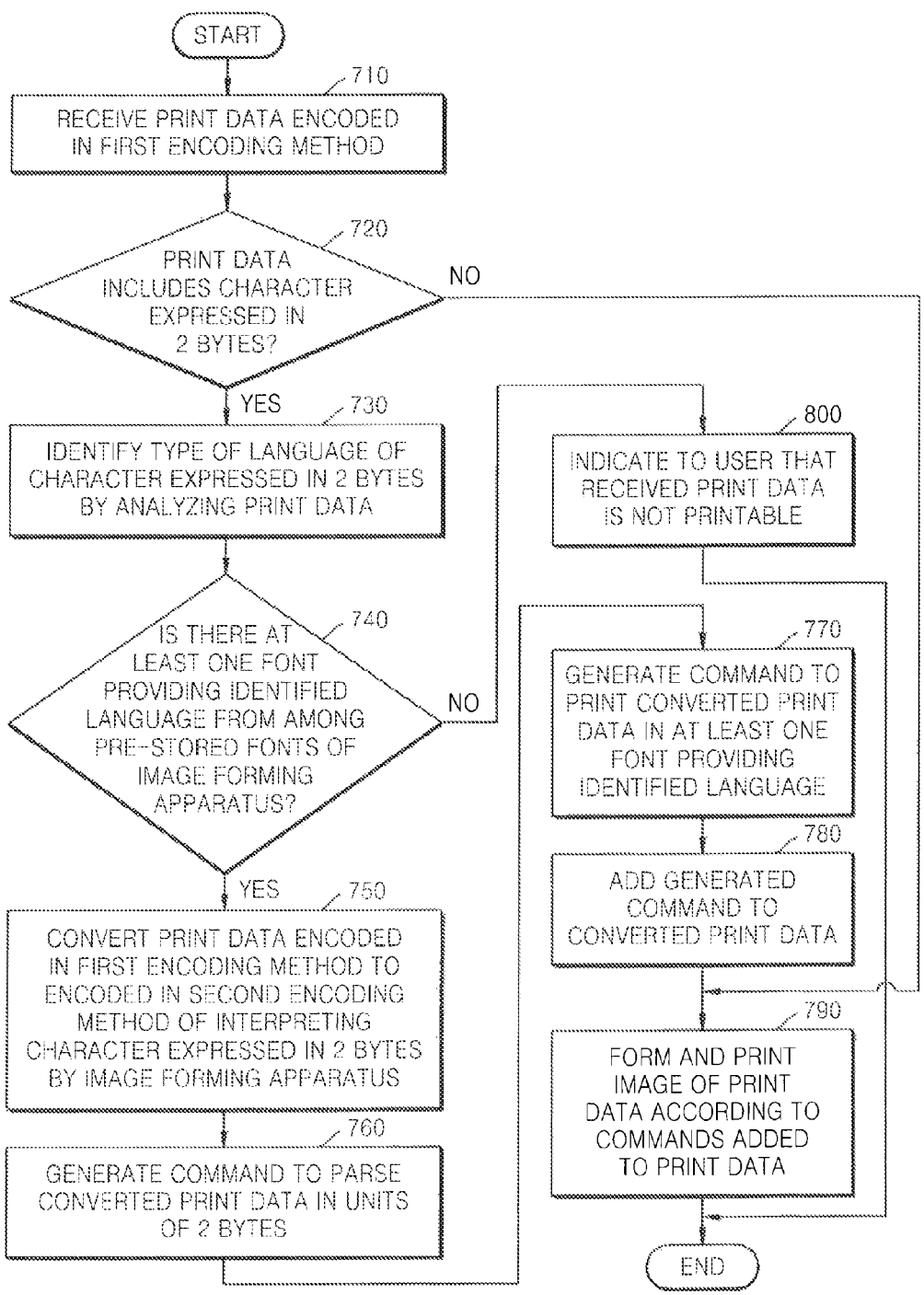
FIG. 7 is a flowchart illustrating a method of performing direct printing of print data by an image forming apparatus, according to another exemplary embodiment of the present general inventive concept.
Figure 8:
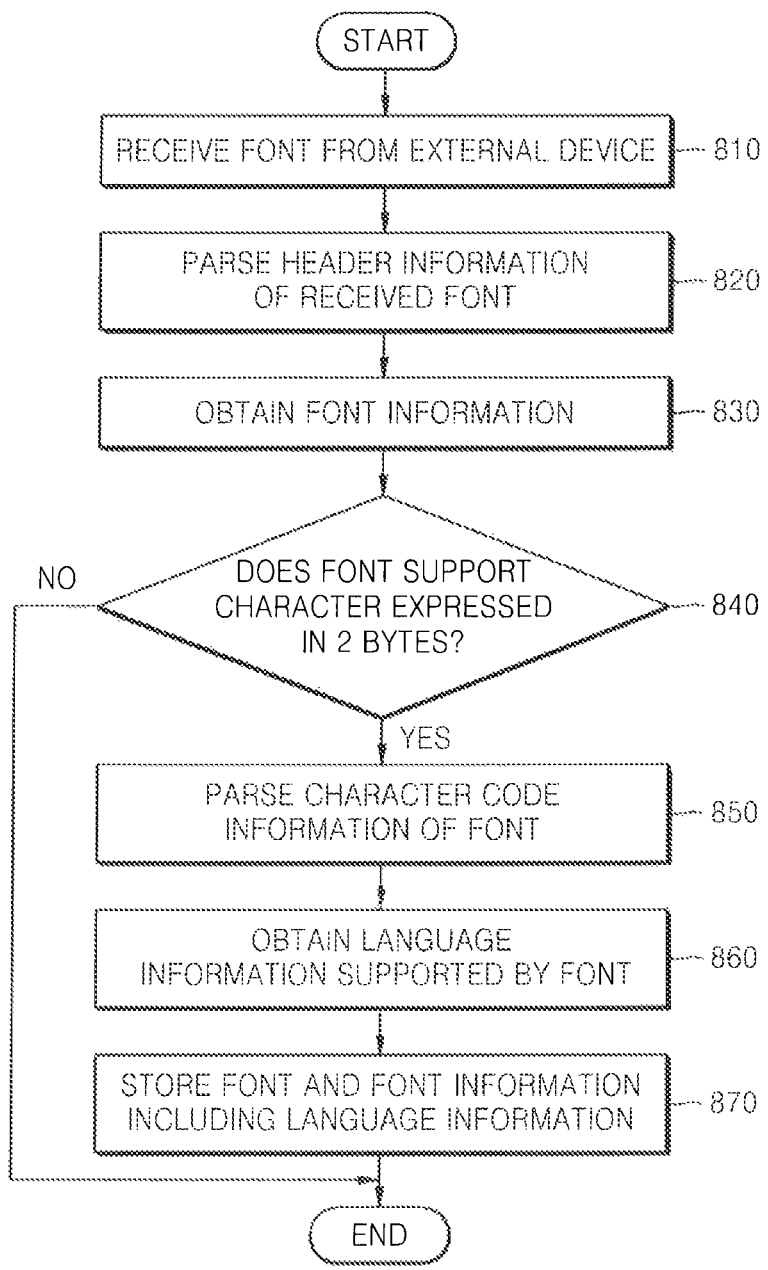
FIG. 8 is a flowchart illustrating a method of managing a font by an image forming apparatus that receives a font from an external device, according to an exemplary embodiment of the present general inventive concept.

FIGS. 6 through 8 are flowcharts illustrating various methods according to various exemplary embodiments of the present general inventive concept. The methods of FIGS. 6 through 8 include operations that are performed in time series by the image forming apparatus 100 of FIGS. 2 and 3. Thus, details described above with reference to FIGS. 2 and 3 are applied to the methods of FIGS. 6 through 8 even if descriptions are omitted.

FIG. 6 is a flowchart illustrating a method of performing direct printing of print data by the image forming apparatus 100, according to an exemplary embodiment of the present general inventive concept.

Referring to FIGS. 1 and 6, the communication interface unit 210 receives the print data encoded in the first encoding method in operation 610. The first encoding method is a method of encoding the print data transmitted by the host device 110 or external device 120 in a direct printing environment. The first encoding method according to the current embodiment may be Unicode, but is not limited thereto.

In operation 620, the first determiner 221 determines whether the print data includes the character expressed in 2 bytes. Here, the character expressed in 2 bytes denotes a character requiring 2 bytes to express each character in code. Examples of the character expressed in 2 bytes include Korean, Chinese, and Japanese hiragana.

In operation 630, the converter 222 converts the print data encoded in the first encoding method to be encoded in the second encoding method that is a method of interpreting the character expressed in 2 bytes by the image forming apparatus 100, if it is determined that the print data includes the character expressed in 2 bytes in operation 630.

The second encoding method according to the current embodiment includes a code system of encoding a character using codes of 2 bytes, and corresponds to a method of interpreting the character expressed in 2 bytes by the image forming apparatus 100. Here, the second encoding method may be Unicode or UTF-8, but is not limited thereto.

In operation 640, the image forming apparatus 100 forms an image of the converted print data.

The image forming apparatus 100 according to FIGS. 1 and 6 determines whether the received print data includes the character expressed in 2 bytes by using the first determiner 221 and converts an encoding method so that the character expressed in 2 bytes is interpreted, thereby preventing the print data including the character expressed in 2 bytes from being abnormally printed.

FIG. 7 is a flowchart illustrating a method of performing direct printing of print data by the image forming apparatus 100, according to another exemplary embodiment of the present general inventive concept.

Referring to FIGS. 3 and 7, in operation 710, the communication interface unit 210 receives the print data encoded in the first encoding method. Also, the communication interface unit 210 receives at least one font from the external device 120 and transmits the at least one font to the font manager 230.

In operation 720, the first determiner 221 determines whether the print data includes the character expressed in 2 bytes. For example, the first determiner 221 may determine whether the print data includes the character expressed in 2 bytes by parsing the print data.

In operation 730, the analyzer 223 identifies the type of language of the character expressed in 2 bytes by analyzing the print data if it is determined that the print data includes the character expressed in 2 bytes in operation 720. For example, the analyzer 223 may identify the type of language of the character expressed in 2 byte by parsing the print data.

In operation 740, the second determiner 224 determines whether there is at least one font providing the language identified in operation 730 from among pre-stored fonts in the image forming apparatus 100.

If the second determiner 224 determines that there is at least one font supporting the identified language, the second determiner 224 outputs information about the corresponding font to the command generator 225 so that the print data is printed in the at least one font.

If the second determiner 224 determines that there is not at least one font supporting the identified language, the image forming apparatus 100 performs operation 800.

In operation 750, if it is determined that there is at least one font providing the identified language in operation 740, the converter 222 converts the print data encoded in the first encoding method to be encoded in the second encoding method of interpreting the character expressed in 2 bytes by the image forming apparatus 100.

In operation 760, the command generator 225 generates a command to parse the print data in units of 2 bytes. If the print data includes the character expressed in 2 bytes, the image forming apparatus 100 parses the print data in units of 2 bytes to print normally.

The command generated by the command generator 225 is a command interpretable by the image forming unit 250, and may be realized in a PCL but is not limited thereto.

In operation 770, the command generator 225 generates a command to print the print data in at least one font providing the identified language. Here, the at least one font corresponds to the at least one font providing the language identified by the analyzer 223.

In operation 780, the command generator 225 adds the commands generated in operations 760 and 770 to the converted print data.

In operation 790, the image forming unit 250 forms the image of the print data according to the commands added to the print data. In detail, the image forming unit 250 receives the converted print data and forms the image of the print data according to the commands added to the print data. Furthermore, if the first determiner 221 determines that the print data does not include the character expressed in 2 bytes in operation 720, the subsequent operation is operation 790, as illustrated in FIG. 7.

In operation 800, the user interface unit 240 indicates to the user that the received print data is not printable if it is determined that there is not at least one font providing the identified language in operation 740.

The image forming apparatus 100 according to FIGS. 3 and 7 analyzes the received print data to identify the type of language of the character expressed in 2 bytes included in the print data, and determines whether there is a font supporting the identified language. Accordingly, the print data is not printed if the image forming apparatus 100 does not have the font supporting the print data, conserving ink and paper by preventing incorrect and unwanted data from being printed.

FIG. 8 is a flowchart illustrating a method of managing a font by the image forming apparatus 100 that received a font from the external device 120, according to an exemplary embodiment of the present general inventive concept.

In operation 810, the communication interface unit 210 receives the font from the external device 120. The communication interface unit 210 transmits the received font to the font manager 230.

In operation 820, the font manager 230 parses the header information of the received font.

In operation 830, the font manager 230 obtains the font information according to the parsing performed in operation 820. The font manager 230 may obtain the font information including the font ID, the font typeface, and the font name, by parsing the header information.

In operation 840, the font manager 230 determines whether the font supports the character expressed in 2 bytes. The font manager 230 may determine whether the font supports the character expressed in 2 bytes by using the header information parsed in operation 820.

If it is determined in operation 840 that the font supports the character expressed in 2 bytes, the font manager 230 parses the character code information of the font in operation 850.

In operation 860, the font manager 230 obtains the language information supported by the font. The font manager 230 may obtain the language information supported by the font by parsing the character code information of the font.

For example, the font manager 230 may determine the language corresponding to the character code ID by reading the character code ID from the character code information, thereby obtaining the language information supported by the font.

In operation 870, the font manager 230 stores the font and the font information including the language information. Accordingly, the font manager 230 manages the font received from the external device 120 and the font information including the language information of the font, and provides the font and the font information to the second determiner 224.

The font manager 230 manages the font information including the language information so that the image forming apparatus 100 may simply determine whether there is a font supporting the language of the print data by referring to the font manager 230.

Accordingly, if there is no font supporting the print data in the image forming apparatus 100, the image forming apparatus 100 may notify the user that there is no font supporting the language of the print data. Thus, the image forming apparatus 100 is prevented from printing incorrect and unwanted data, thereby conserving paper and ink.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of performing direct printing of print data in an image forming apparatus, the method comprising:
receiving print data encoded in a first encoding method;
determining whether the print data includes a character expressed in 2 bytes such that the character is from a language different from English by obtaining units of 2 bytes from the print data and checking whether at least one of the units of 2 bytes is in a predetermined range;
converting the print data encoded in the first encoding method to be encoded in a second encoding method to analyze the character expressed in 2 bytes in the image forming apparatus when the print data includes the character expressed in 2 bytes; and
forming an image of the converted print data to display the character from the language different from English.

2. The method of claim 1, further comprising:
generating a command of parsing the converted print data in units of 2 bytes when the print data is converted; and
adding the generated command to the converted print data.

3. The method of claim 2, wherein the command is a printer command language (PCL).

4. The method of claim 1, further comprising identifying a type of the language of the character expressed in 2 bytes by analyzing the print data if the print data includes the character expressed in 2 bytes.

5. The method of claim 4, further comprising:
determining whether there is at least one font providing the identified language from among pre-stored fonts of the image forming apparatus according to a result of the identifying;

generating a command to print the converted print data in the at least one font if there is the at least one font providing the identified language; and adding the generated command to the converted print data.

6. The method of claim 5, further comprising indicating to a user that the received print data is data that is not printable if there is not at least one font providing the identified language.

7. The method of claim 5, further comprising:
receiving at least one font from an external device; and
storing the received at least one font and language information about the received at least one font,
wherein the determining of whether there is at least one font providing the identified language is performed based on the stored language information.

8. The method of claim 7, wherein the image forming apparatus determines language information supported by the received font by parsing character code information of the received font.

9. The method of claim 1, wherein the determining comprises determining whether the print data includes the character expressed in 2 bytes by parsing the print data.

10. The method of claim 1, wherein the first encoding method is an American Standard Code for Information Interchange (ASCII) code, and the second encoding method is a Unicode.

11. An image forming apparatus to perform direct printing of print data, the image forming apparatus comprising:
a communication interface unit to receive print data encoded in a first encoding method;
a first determiner to determine whether the print data includes a character expressed in 2 bytes such that the character is from a language different from English by obtaining units of 2 bytes from the print data and checking whether at least one of the units of 2 bytes is in a predetermined range; and
a converter to convert the print data encoded in the first encoding method to be encoded a second encoding method of analyzing the character expressed in 2 bytes in the image forming apparatus when it is determined by the first determiner that the print data includes the character expressed in 2 bytes to display the character from the language different from English.

12. The image forming apparatus of claim 11, further comprising a command generator to generate a command to parse the converted print data in units of 2 bytes if the converter converts the print data, and to add the generated command to the converted print data.

13. The image forming apparatus of claim 11, further comprising an analyzer to analyze the print data to identify a type of the language of the character expressed in 2 bytes, if the first determiner determines that the print data includes the character expressed in 2 bytes.

14. The image forming apparatus of claim 13, further comprising:
a second determiner to determine whether there is at least one font providing the identified language from among pre-stored fonts of the image forming apparatus according to a result of the analyzing by the analyzer; and
a command generator to generate a command of printing the converted print data in the at least one font and adding the generated command to the converted print data, if the second determiner determines that there is the at least one font providing the identified language.

15. The image forming apparatus of claim 14, further comprising a user interface unit to indicate to a user that the received print data is not printable if the second determiner determines that there is not at least one font providing the identified language.

16. The image forming apparatus of claim 14, further comprising a font manager to receive at least one font from an external device through the communication interface unit, obtain language information supported by the received font by parsing character code information of the received font, and manage font information including the language information along with the received font,
wherein the second determiner determines whether there is at least one font providing the identified language based on the language information of the font manager.

17. The image forming apparatus of claim 11, wherein the first determiner determines whether the print data includes the character expressed in 2 bytes by parsing the print data.

18. The image forming apparatus of claim 11, wherein the first encoding method is an American Standard Code for Information Interchange (ASCII) code, and the second encoding method is Unicode.

19. A non-transitory computer readable recording medium having embodied thereon a computer program to execute a method of performing direct printing of print data in an image forming apparatus, wherein the method comprises:
receiving print data encoded in a first encoding method;
determining whether the print data includes a character expressed in 2 bytes such that the character is from a language different from English by obtaining units of 2 bytes from the print data and checking whether at least one of the units of 2 bytes is in a predetermined range;
converting the print data encoded in the first encoding method to be encoded in a second encoding method to analyze the character expressed in 2 bytes in the image forming apparatus, when the print data includes the character expressed in 2 bytes; and
and
forming an image of the converted print data to display the character from the language different from English.

20. An image forming apparatus to perform direct printing of print data, the image forming apparatus comprising:
a communication interface unit to receive print data encoded in an American Standard Code for Information Interchange (ASCII) code;
a first determiner to determine whether the print data includes a character expressed in 2 bytes by obtaining units of 2 bytes from the print data and checking whether at least one of the units of 2 bytes is in a predetermined range;
a converter to convert the print data encoded in the ASCII code to be encoded in Unicode;
a command generator to generate a command to parse the converted print data in units of 2 bytes if the first determiner determines that the print data includes the character expressed in 2 bytes such that the character is from a language different from English; and
an image forming unit to form an image of the converted print data according to the generated command to display the character from the language different from English.

* * * * *

UNITED STATES PATENT AND TRADEMARK OFFICE
CERTIFICATE OF CORRECTION

PATENT NO. : 8,947,680 B2  
APPLICATION NO. : 13/621945  
DATED : February 3, 2015  
INVENTOR(S) : Young-hee Huh Page 1 of 1

It is certified that error appears in the above-identified patent and that said Letters Patent is hereby corrected as shown below:

In the Claims

Column 18, Line 37, In Claim 19, delete "bytes; and" and insert -- bytes; --, therefor.

Signed and Sealed this
Fourteenth Day of July, 2015

Michelle K. Lee
*Director of the United States Patent and Trademark Office*